Sept. 4, 1945.  C. WIDELL  2,384,358
FILM TRANSPORT MECHANISM
Filed June 16, 1943  5 Sheets-Sheet 3
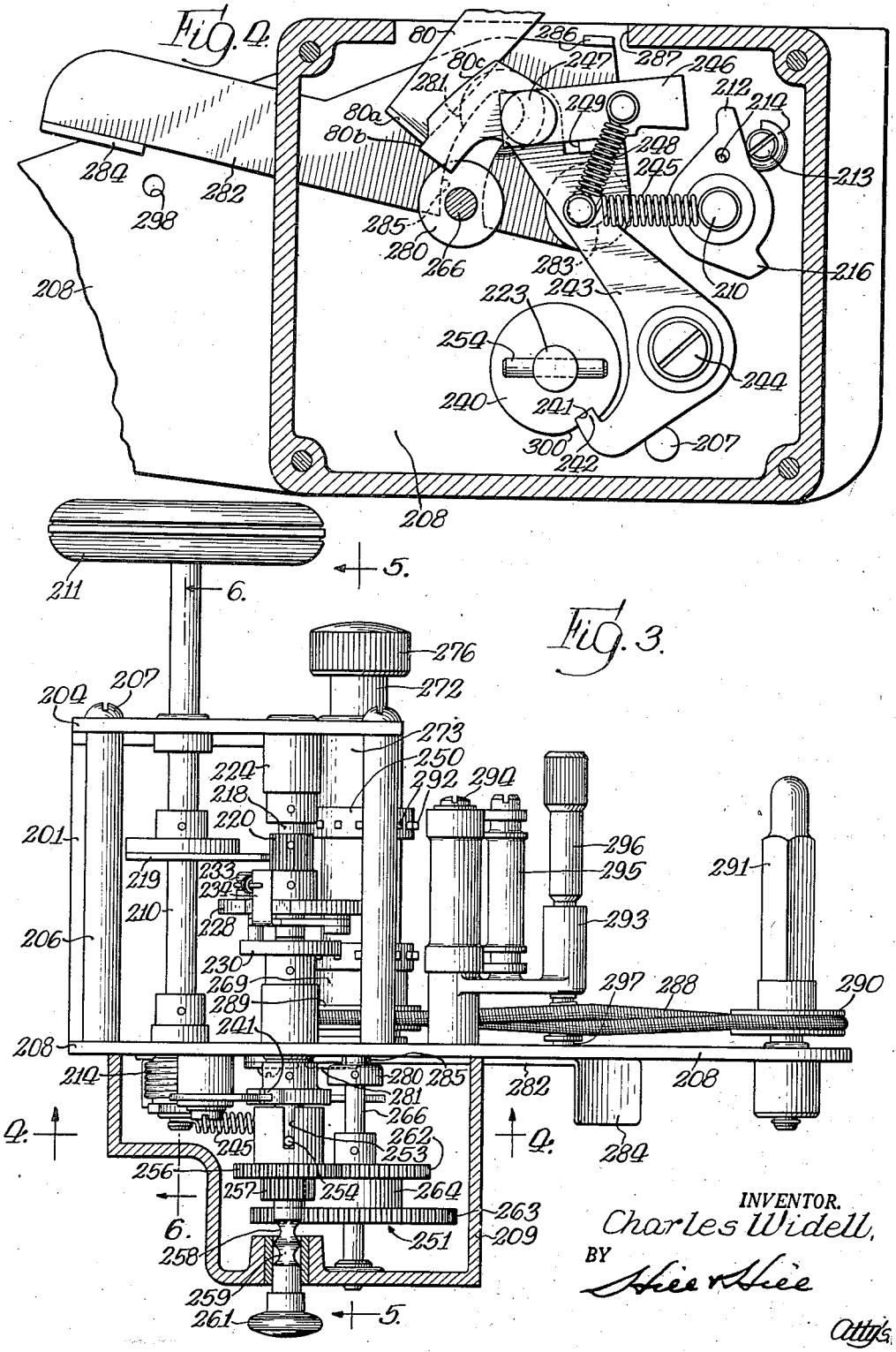
INVENTOR.
Charles Widell,
BY
Hill & Hill
Att'ys.

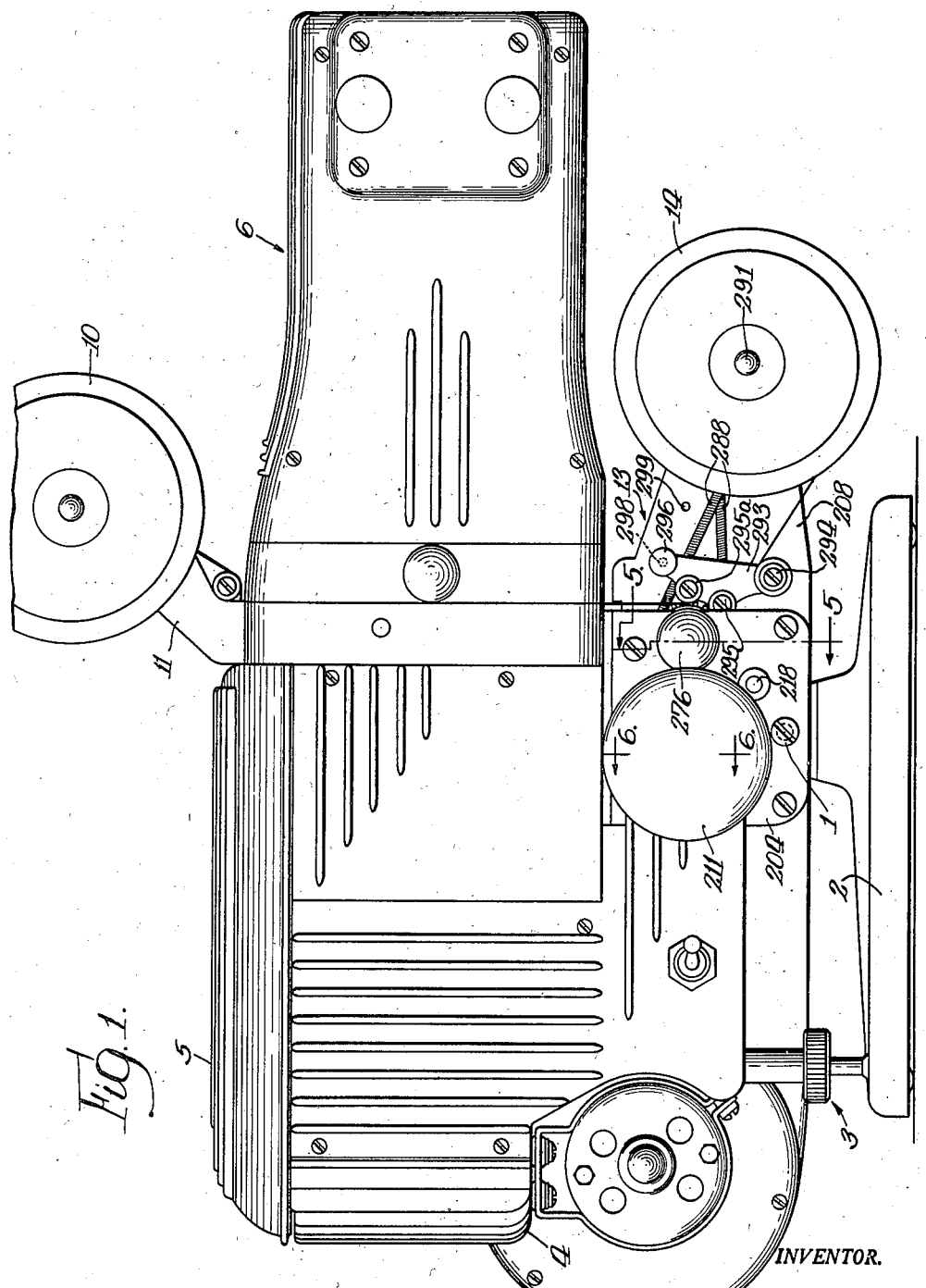

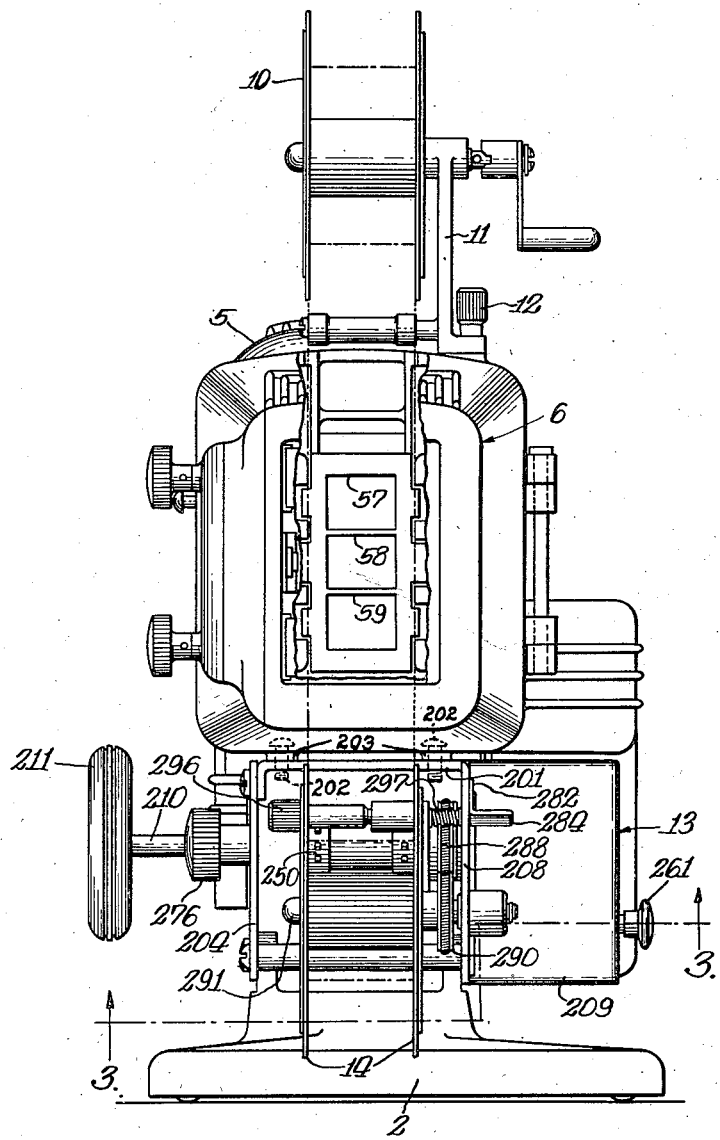

Sept. 4, 1945. C. WIDELL 2,384,358
FILM TRANSPORT MECHANISM
Filed June 16, 1943 5 Sheets-Sheet 4
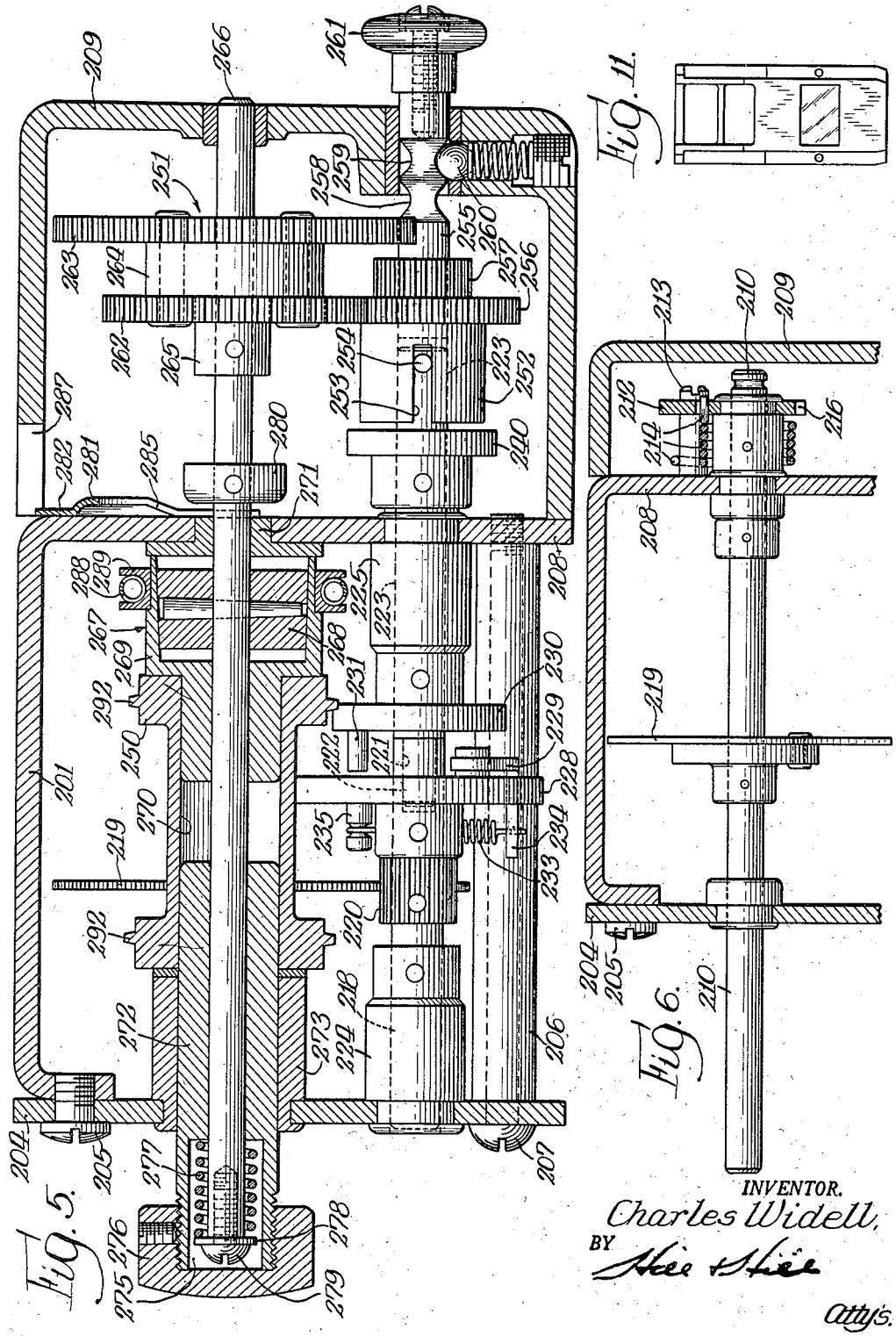
INVENTOR.
Charles Widell,
BY
Atty's.

Sept. 4, 1945.  C. WIDELL  2,384,358

FILM TRANSPORT MECHANISM

Filed June 16, 1943  5 Sheets-Sheet 5

INVENTOR.
Charles Widell,
BY
Atty's

Patented Sept. 4, 1945

2,384,358

UNITED STATES PATENT OFFICE 2,384,358

FILM TRANSPORT MECHANISM

Charles Widell, Chicago, Ill., assignor to Prismacolor, Inc., Chicago, Ill., a corporation of Illinois Application June 16, 1943, Serial No. 490,994

15 Claims. (Cl. 88—28)

The present invention is directed to a new form, construction, arrangement and combination of parts all embodied in a projector adapted for multiple color picture projection. This projector is of the type wherein individual images or colored cut-outs of the same photographed object are provided by a film or a plate and are projected upon a screen by an assembly of juxtaposed lenses or lens groups, and wherein the respective groups of lenses are positioned in the paths of light that are passed through the respective color filters and wherein the images are brought into focus upon a common plane comprising a picture screen so as to present a composite colored picture by the superimposed relation of the different colored images. In the device of the present invention, the photographed objects are provided on a film in triplicate and in black and white by any suitable camera for this purpose, and the film is fed vertically through the machine. The same machine could be constructed to feed the film horizontally if that should be desired depending upon the type of film and the nature of the camera producing this film.

It is one of the main objects of the present invention to embody into a projector of this type a new and novel film transport mechanism or film feed which is utilized for advancing the film into proper relation with respect to the lens system of the projector. This film transport mechanism is adapted for advancing each group of three pictures bodily and may also be utilized for advancing individual frames of pictures should that be desired. When the projector is used for reproducing individual pictures from films containing such pictures, the projector is then adapted for black and white reproduction, and in that case the frame carrying the color filters may be replaced by a suitable masking frame which contains only one aperture to admit light from the lens housing through the center group of lenses and on to the screen.

The film transport mechanism incorporates a number of features such as the provision of a clutch which when released will allow the film to be hand fed in either direction and the feature of providing suitable connecting means for releasing all pressure of the film guiding mechanism immediately prior to moving the film by the transport means. Also, the film transport mechanism is hand operated by means of a hand knob so connected as to feed the film when turned in one direction and which is capable of resetting itself in the reverse direction to allow the next hand feed to be repetition of each successive picture advancing operation. Only a partial turn of the hand knob is required to feed the film.

All further improvement and refinement in the various mechanisms embodied in the projector of the present invention shall hereinafter be referred to in a more detailed description of the working parts thereof and as relating to the accompanying drawings illustrating a preferred embodiment of the projector of the present invention.

In the drawings:

Fig. 1 is a side elevational view showing a projector embodying the film transport or film feed mechanism of the present invention;

Fig. 2 is a front elevational view partially broken away and in section also illustrating the relation of this mechanism to the path of the film;

Fig. 3 is a bottom elevational view of the film transport mechanism and its associated parts with a portion of the projector housing in section, substantially as viewed along the line 3—3 in Fig. 2;

Fig. 4 is a cross sectional view taken substantially along the line 4—4 in Fig. 3, illustrating certain of the film transport mechanism parts, this figure being inverted with respect to Fig. 3 and shown in its normal position in relation to the upright projector;

Fig. 5 is a transverse cross sectional view taken through the film transport mechanism and as viewed substantially along the lines 5—5 in Figs. 1 and 3;

Figure 7:
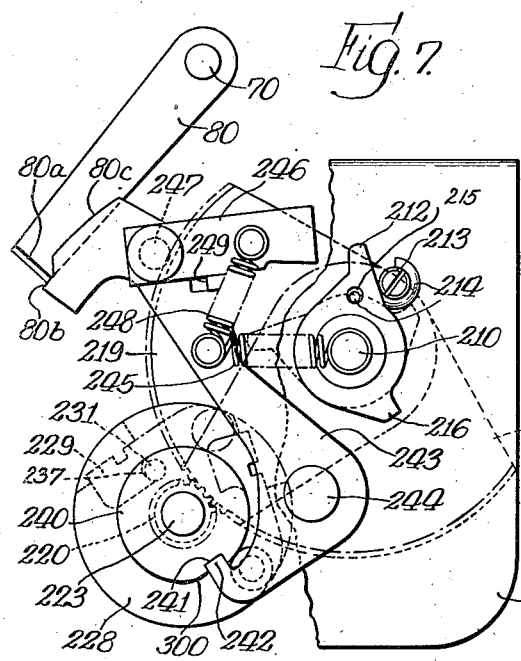

Fig. 6 is a fragmentary sectional view taken along the lines 6—6 in Figs. 1 and 3, respectively; and Figs. 7 to 10 inclusive are fragmentary illustrations of certain of the working parts of the film transport mechanism showing the same in various operative relationships to illustrate certain steps in the operation of said film transport mechanism during the feeding operation thereof; and Fig. 11 is a face view of the masking frame with the single aperture which may be utilized to replace the frame carrying the color filters whenever the projector is being used in single frame picture projection for black and white films.

It is obvious to incorporate a film transport mechanism of the present design in various types or kinds of projectors and the particular embodiment disclosed in the drawings is given and described as a preferred example of one arrangement and incorporation of such a mechanism.

The projector is pivotally supported at 1 upon a base 2 and may be suitably tilted as by the leveling screw mechanism 3 in a known manner. The projector housing is primarily divided into a main casing or lamp housing 4, having a removable cover 5 for access to the lamp housing and a lens housing 6 which is pivotally supported upon the lamp housing. The film may be fed through the projector housing in any desirable manner, and in the present construction the film supply reel 10 is pivotally mounted on a bracket 11 secured to the lamp housing 4 by a knurled screw 12 and the film is passed through the projector housing substantially along the line of the opposing surfaces of the lamp housing 4 and the pivotal lens housing 6 and passes through suitable mechanism comprising the film transport unit 13 which is adapted for moving the film through the projector and for driving the film rewind reel 14.

The film transport mechanism 13 is supported by means of a bracket 201 fastened to the underside of the lamp housing 4 by means of the screws 202, see Fig. 2, which pass into the appropriate bosses 203. The side plate 204 is secured to one end of the bracket 201 by means of screws 205, said plate depending from the upper end of the bracket and being secured at its lower end by means of tubular spacers 206 and bolts 207, which pass through the spacers and thread into the depending side 208 of the bracket 201. Another housing 209 is secured to the side 208 of the bracket 201 for housing a portion of the film transport mechanism therein as best shown in Figs. 3, 4 and 5.

Referring more particularly to Figs. 4, 5 and 6, which illustrate the film transport mechanism, movement is imparted to the film by means of the drive shaft 210 when the latter is rotated by the hand wheel 211. Shaft 210 is journaled in the side 208 of the bracket 201 and in the side plate 204 and projects into the housing 209. An actuating arm 212 is secured to the end of the shaft 210 within the housing 209 and the arm 212 is normally maintained against the stop 213 by means of a coil spring 214 which has one end looped about the stop 213 with the other end disposed in the hole 215 in the actuating arm 212. The foregoing mechanism will, therefore, maintain the shaft 210 in a definite position at all times and at the same time the shaft 210 may be rotated a limited amount against the action of the spring 214 with the spring returning the shaft and the hand wheel 211 to their initial position whenever the hand wheel 211 is released. The actuating arm 212 is provided with a lug 216 adapted to strike against the pin 213 for limiting the movement of the hand wheel 211 and its associated shaft 210 when the hand wheel is turned against the action of the spring 214.

The drive from shaft 210 is transmitted to a shaft 218 through the instrumentality of the gear segment 219 secured to shaft 210 and the pinion 220 secured to shaft 218. Shaft 218 is provided with a reduced bore 221 adapted for receiving the reduced end 222 of shaft 223 which is aligned with shaft 218. This provides two relatively movable shafts rotatable about a common axis and the shafts are supported in the bearings 224 and 225 carried in the side plate 204 and bracket 208, respectively, with their intermediate support being provided by the connection 221 and 222.

In order to transmit the drive from the shaft 218 to the shaft 223, a lost motion connection is provided which includes a first disc 228 keyed to the shaft 218 and which pivotally supports the dog 229, and a disc 230 that is secured to the shaft 223 and the latter supports a pin 231 in the path of the dog 229 of the disc 228. The dog 229 is normally maintained in fixed relation to the disc 228 and also with respect to the pin 231 by means of the spring 233 which is connected between the ear 234 of the dog 229 and the pin 235 secured to the side of the disc 228. It is to be noted that the ear 234 is made to project at right angles to the face of the dog 229 so as to engage the surface 236 of the disc 228 thereby maintaining the hook portion 237 of said dog in proper spaced relation from the axial center of the shaft 218 for the purpose of hooking onto the pin 231 as the disc 228 is relatively rotated with respect to the disc 230.

The shaft 223 projects into the housing 209 and a rotational limit control latch 240 is secured to the shaft 223 within the housing 209. The latch wheel 240 is provided with the notch 241 which is adapted to receive the end 242 of the lock arm 243. The lock arm 243 is pivotally supported at 244 on the side plate 208 of the bracket 201 and the spring 245 is adapted to normally urge the lock arm 243 in a direction to maintain the stop lug 242 in the notch 241 of the latch wheel 240. The lock arm is provided with a spring-pressed dog 246 pivotally supported at 247 on the lock arm 243 and the spring 248 normally holds the dog 246 against the ear 249 which is part of the dog 243 and which is bent at right angles to the face thereof. With this particular construction, the dog 246 provides a driving means for rotating the lock arm 243 whenever the actuating arm 212 is rotated by means of the hand wheel 211, since the dog 246 and actuating arm 212 are disposed in vertical alignment with the dog in the path of the actuating arm.

In order to permit free movement of the film during the transposition of the pictures which are being projected, the pressure on the film in the film gate (not shown) must be relieved at that time. This is accomplished through an arm 80 mounted on a shaft 70 journaled in suitable bearings (not shown). Movement of the arm 80 is accomplished by means of the lock arm 243 (see Fig. 7) which is provided with an outer face 80b upon which an ear 80a of the arm 80 normally rests, but when the lock arm is moved from the position seen in Fig. 7 to that seen in Fig. 8, the ear rides up an inclined face of the lock arm to a face 80c, whereby the arm 80 is swung upward slightly, thereby releasing the pressure of the film gate on the film. Inasmuch as the film gate and its operating mechanism forms no part of this application, no description of it is thought necessary.

The drive to the film sprocket 250 is completed by means of the shiftable gear train designated generally by 251 and which is enclosed within the housing 209. A gear unit comprising the bearing member 252 is provided with a slot 253 engageable by the pin 254 secured to the end of the shaft 223. The bearing member 252 journals on the end of the shaft 223 and has a stub shaft portion 255 connected therewith for supporting the gears 256 and 257 for rotation therewith. The outer end of the stub shaft 255 is provided with spaced grooves 258 and 259 to each releasably engage spring-pressed ball 260 in the manner best illustrated in Fig. 5. The outer end of the stub shaft 255 projects through the housing 209 and the hand knob 261 is secured to the projecting end of the shaft. By moving the stub shaft 255 by means of the knob 261 from the groove position 259 to the position 258, the gears 256 and 257 are shifted as a unit to engage the gears 262 and 263 by selection depending upon whether the knob 261 is moved inwardly or outwardly relative to the housing 209.

Other gears 262 and 263 are riveted to the flange 264 of the supporting member 265 and the latter is keyed to the shaft 266, which traverses the housing 209 and the bracket 201 and side plate 204. The drive from the shaft 266 is transmitted to the film sprocket 250 through releasable clutch means 267. The clutch 267 comprises the friction wheel 268 adapted to fit within and to engage the inner conical walls of the cupped sleeve 269, the latter being suitably secured to the inner bore 270 of the drive sprocket 250. The intermediate portion of the shaft 266 is journaled in the bushing 271 in the cupped sleeve 269 and also in a sleeve 272 which is journaled within the bearing 273 carried by the side plate 204.

The sleeve member 272 is also suitably press-fitted or otherwise secured within the bore 270 of the film sprocket 250 and at one end thereof the sleeve 272 is provided with the cavity 275 which is closed by means of the hand knob 276 suitably threaded upon the cavity end of the sleeve 272. Shaft 266 projects into the cavity 275 and the spring 277 is confined within the shoulder of the cavity 275 and the washer 278 secured to the end of the shaft 266 by means of the screw 279. It is the action of the spring 277 which urges the shaft 266 laterally toward the left as viewed in Fig. 5, so as to hold the clutch wheel 268 in frictional engagement within the cupped sleeve 269 to normally transmit the drive from the shaft 266 to the rotatable sprocket 250 and its associated mechanisms.

As is necessary in most projectors and for the convenience of threading the film through the projector, the sprocket 250 by the aforementioned arrangement including the clutch mechanism may be disengaged from the drive transmitted thereto by the shaft 266. This is accomplished by providing the collar 280 fixed to the shaft 266 and by engaging the collar 280 by means of a cam portion 281 carried by the lever 282 suitably pivoted at 283 on the side 208 of the bracket 201. The outer end of the lever 282 is provided with a finger tab 284 to permit the easy operation of the lever and the lever is provided with a slot 285 concentrically located with respect to its pivot 283 for the purpose of straddling the shaft 266 to bring the raised cam portion 281 into engagement with the collar 280 for the purpose of shifting the shaft 266 laterally. Obviously, lateral movement of the shaft 266 against the action of the spring 277 will carry the clutch wheel 268 out of frictional engagement with the inner surface of the cupped sleeve 269. The downward limit of the movement of the lever 282 shall be governed by the end of the slot 285, while the upper limit of movement of the lever 282 is stopped by means of the lug 286 which is disposed at right angles to the face of the lever and which is adapted to engage the edge portion 287 of the housing 209.

Therefore, when the lever 282 is operated to interrupt the drive from the shaft 266 to the sprocket 250, it is then possible to turn the knob 276 for rotating the sprocket 250 by means of the sleeve 272 and such rotation may be accomplished in either direction as desired to properly thread the film through the projector.

During the normal operation of the film transport mechanism in advancing the film by means of the hand wheel 211 through the mechanism to the sprocket 250, this driving motion is transmitted by means of the spring belt 288 which passes over the pulley 289 fixed to the cupped sleeve 269 and over the pulley 290 connected with and secured to the reel spindle 291 which drives the takeup reel to wind up the film as the latter is fed through the projector. Also, the film is held in engagement with the sprocket teeth 292 by means of the swingable bracket 293 pivoted at 294 and carrying the two rollers 295 and 295a, respectively, which maintain the film perforations in engagement with the teeth 292 of the sprocket 250. A suitably spring-pressed latch pin 296 has a reduced end 297 which will normally engage into either one of two positions as determined by the holes 298 and 299 carried by the side 208 of the bracket 201. The swingable bracket holds the film in driving position with respect to the sprocket 250 when the latter is in the position wherein the pin 297 is in engagement with the hole 298. By moving the bracket into a position away from the sprocket wherein the pin 297 engages the hole 299, the film may be easily threaded or removed from the machine.

Figure 8:
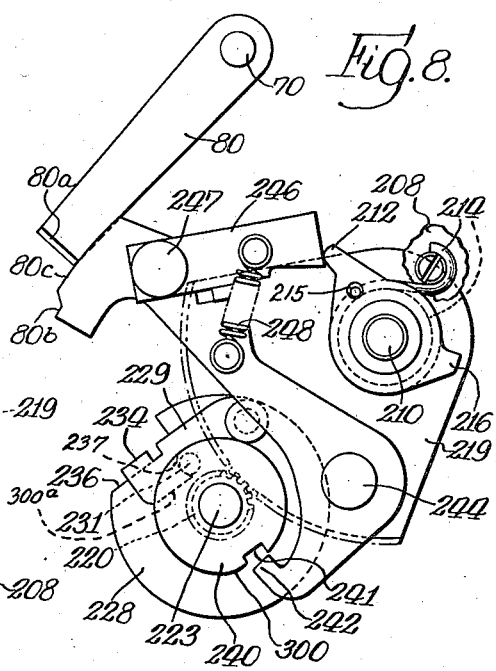
Figure 9:
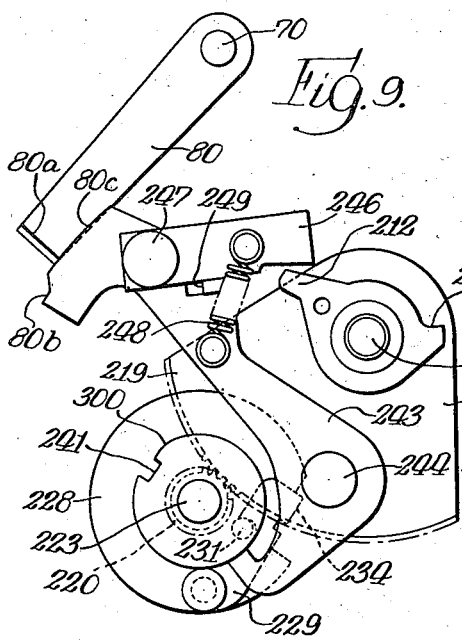
Figure 10:
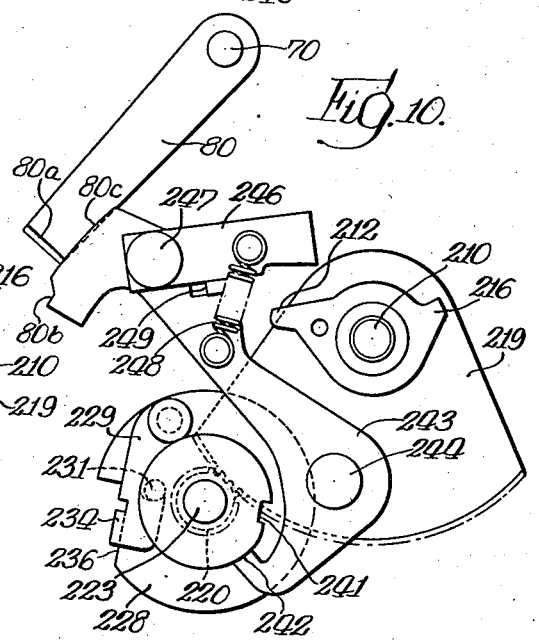

Referring now more particularly to Figs. 7 to 10, inclusive, the operation of the film transport mechanism may best be described as follows: The rotation of the actuator arm 212 will cause the arm to strike the end of the dog 246 which in turn will rock the lock arm 243 about its pivot 244 to move the latch lug 242 of the arm out of the notch 241 of the latch wheel 240. During this movement, the segment gear 219 will revolve the pinion 220, but as best shown in Fig. 7, the dog 229 by its position relative to the pin 231 when turned in clockwise direction has sufficient movement prior to the engagement of the pin 231 to allow the free movement of the parts hereinbefore referred to. As the actuator arm 212 continues its motion and as best seen in Fig. 8, the lock arm is now moved out of engagement with the notch 241 and continued motion of the shaft 210 and its actuator arm 212 will now cause the dog 229 to have its hooked end 237 engage the pin 231. Obviously, as the dog 229 engages the pin 231, shafts 218 and 223 of Fig. 5 will now rotate as a unit to drive the gear group comprising the gears 256 and 257 through the instrumentality of the pin 254 and the slot 253, the latter also being best illustrated in Fig. 5. Also as best shown in Fig. 9, continued rotation of the shaft 210 by the knob 211 will now cause the actuator arm 212 to pass beyond the end of the dog 246 releasing the lock arm 243 and the latter through the action of the spring 245 will then be rotated in a clockwise direction to cause the lug 242 of the arm to engage against the outer concentric surface of the latch wheel 240. At this stage, the arm 243 and its associated mechanisms will be held against rotation and in the fixed position shown in Fig. 9, while continued rotation of the shaft 210 now additionally drives the gears 256 and 257 through the segmental gear 219 and pinion 220 and the connected shafts 218 and 223.

Rotation of the shafts 218 and 223 as a unit is then continued until the notch 241, best shown in Fig. 10, will again receive the lug 242 of the arm 243. To insure positive engagement of the lug 242 within the slot 241, the peripheral surface of the latch wheel 240 is flattened substantially as shown at 300 to drop the lug 242 radially into the path of the wall of the notch 241 oppositely disposed with respect to the surface 300. It is, therefore, seen that each movement of the hand wheel 211 through the mechanism described will cause one complete revolution of the shafts 218 and 223 as determined by the notch 241 on the latch wheel 240, and its relation to the lug 242 on the lock arm 243.

Also, the reverse motion of the disc 228 carrying the dog 229 is greater than one revolution in view of the fact that the dog as best shown in Fig. 7 must first advance to engage the pin 231 and thereafter rotate the pin through 360 degrees. It is for this reason that the dog 229 is resiliently maintained against the face 236 of the disc 228 by means of the spring 233 inasmuch as the reverse motion of the disc 228 will then allow the surface 300a contiguous with the hook portion 237 of the dog to engage and snap past the pin 231 during the reversal of movement of the shaft 218 carrying the disc 228. Obviously, the disc 228 and its dog 229 will then be returned to the position illustrated in Fig. 7, after the pinion 220 and its driving gear segment 219 are returned to the position initially shown in Fig. 7, wherein the actuator arm 212 will abut the stop 213 which is the initial and inoperative position of the film transport mechanism.

The gear mechanism indicated generally at 251 in Fig. 5 has been devised for the purpose of providing means for advancing the film either three frames at a time or by means of a single frame whenever black and white individual frame picture projection is desired. It is for this purpose that the shifting device as best illustrated in Fig. 5 has been incorporated. The drive as now shown with the knob 261 moved adjacent the housing 209 will provide the necessary rotation through the gears 256 and 262 for rotating the sprocket 250 an amount whereby the lineal movement of the film will bodily advance successive groups of three frames of each photographed object for the purpose of color projection.

Whenever the knob 261 is moved outwardly and away from the housing 209 into its other position, the drive from shaft 223 through the pin 254 and notch 253 will now be transmitted through the pinion 257 and gear 263 providing a different gear ratio whereby the drive to shaft 266 will advance the film sprocket 250 to the extent whereby the film will be advanced a single frame at a time whenever black and white single frame projection is desired. Whenever the projector is to be used for such a single frame projection as for black and white film, the usual filter frame is removed from the machine and the frame illustrated in Fig. 11 with the single aperture is then substituted for it to permit single frame projection. The aperture in the replaceable frame may be provided in any one of three positions corresponding to the three different lens groups, etc., but as shown, the opening is located to pass the light from the center group. The use of a replacement frame of the class described is generally known in the art.

With the transport mechanism just described it is possible by means of the reductions imposed through the various gears to obtain a high speed film advance which will be great enough so as to be substantially imperceptible to the eye without causing annoyance to the observers during screen projection. It is to be noted that the film advance is controlled by approximately a quarter turn of the knob 211 making it simple for an operator to obtain the high speed through the transport gear mechanism. It is for this reason that the present projector has made possible the elimination of shutter mechanism, adding to the simplicity of the entire projector with a corresponding saving in the cost of production by eliminating such additional mechanism.

Since each picture transposition requires only about a 90 degree turn of the knob 211 and the latter is automatically returned to its initial position each time by the coil spring 214, only a slight movement of the hand efficiently changes the projected pictures.

The foregoing description relating to the preferred embodiment of the present projector as disclosed in the drawings may obviously permit various modifications in the preferred construction that presumably will not depart from the general scope and field of the present invention. Hence, it is to be understood that the present projector is not to be limited to the exact form, construction, arrangement or combination of parts as specifically referred to and described, or for the particular uses mentioned, excepting insofar as shall be governed by the appended claims.

What I claim as new and desire to secure by Letters Patent is:

1. A film transport mechanism for projectors comprising an oscillatory drive shaft, means for controlling the rotation of said shaft between certain predetermined limits, film driving mechanism including a drive and driven shaft adapted for advancing at least one film frame at a time, intermeshing toothed elements mounted on said oscillatory drive shaft and on the drive shaft of said film driving mechanism to drive the latter and for advancing the film, and a unidirectional clutch connected between said drive and driven shafts of the film driving mechanism, said oscillatory drive shaft being adapted for actuating said film driving mechanism during one directional movement of said oscillatory shaft only.

2. A film transport mechanism for projectors comprising an oscillatory drive shaft, means for controlling the rotation of said shaft between certain predetermined limits, film driving mechanism including a drive, a driven shaft, a unidirectional clutch therebetween, and a film sprocket for advancing at least one image frame at a time, intermeshing toothed elements mounted on said oscillatory drive shaft and the driven shaft of said film driving mechanism to drive the latter and to advance the film, said oscillatory drive shaft being adapted for actuating said film driving mechanism during one direction of oscillation of the drive shaft only, clutch mechanism connected with said film driving mechanism for optionally disconnecting the drive from the same to said film sprocket, and means independent of said drive shaft for rotating the film sprocket when the drive is disconnected therefrom.

3. A film transport mechanism for projectors comprising an oscillatory drive shaft, means for controlling the rotation of said shaft between certain predetermined limits, film driving mechanism including a film sprocket for advancing at least one image frame at a time, intermeshing toothed elements on said oscillatory drive shaft and a member of said film driving mechanism to drive the latter and for advancing the film, a unidirectional clutch between two members of said film driving mechanism said oscillatory drive shaft being adapted for actuating said film driving mechanism during the oscillatory movement of the drive shaft in one direction only, and clutch mechanism connected with said film sprocket for optionally disconnecting the same from said film driving mechanism, said film sprocket having auxiliary drive means independent of said oscillatory drive shaft connected with the film sprocket to move said film freely in either direction through the projector while said film driving mechanism is declutched.

4. A film transport mechanism for projectors comprising an oscillatory drive shaft, means for controlling the rotation of said shaft between certain predetermined limits, film driving mechanism including two shafts with variable speed transmission gearing between them and providing means for advancing one or more image frames at a time, shiftable means connected with said variable speed transmission gearing of the film driving mechanism functioning to selectively cause the latter to move either one frame or a plurality of frames each time, and means connectible between said oscillatory drive shaft and said film driving mechanism to drive the latter and for advancing the film, said oscillatory drive shaft being adapted for actuating said film driving mechanism during the oscillation of the drive shaft in one direction only.

5. A film transport mechanism for picture projection comprising an oscillatory drive shaft, a pair of countershafts, and film sprocket mechanism to intermittently advance the film images, intermeshing toothed elements between said drive shaft and one of said countershafts to revolve the latter, a one way clutch mechanism for connecting said countershafts at a predetermined interval during the actuation of said drive shaft, and sprocket driving means connected between the other of said countershafts and said sprocket mechanism to advance the film during the effective operation of said one way clutch.

6. A film transport mechanism for picture projection comprising an oscillatory main drive shaft, a pair of countershafts, and a film driving sprocket to advance the film for changing the picture images, intermeshing toothed elements between said drive shaft and one of the countershafts to positively revolve the latter, a one way clutch unit for connecting said countershafts, said clutch being adapted to operatively join said counter shafts after a predetermined interval of movement of said main drive shaft, sprocket driving means connected between the other of said countershafts and the film sprocket to advance the film during the effective operation of said one way clutch.

7. A film transport mechanism for picture projection comprising an oscillatory main drive shaft, a pair of countershafts, and a film driving sprocket to advance the film for changing the picture images, actuating means connected between said main drive shaft and one of the countershafts to positively revolve the latter, a one way clutch unit for connecting said countershafts, said clutch being adapted to operatively join said countershafts after a predetermined interval of movement of said main drive shaft, sprocket driving means connected between the other of said counter-shafts and the film sprocket to advance the film during the effective operation of said one way clutch, and automatic stop means functioning to stop the clutch driven countershaft after a definite lineal advance of the film.

8. A film transport mechanism for picture projectors comprising an oscillatory main drive shaft, a pair of aligned countershafts, and a film driving sprocket to advance the film for changing the picture images, intermeshing toothed elements between said main drive shaft and one of the countershafts to positively revolve the latter, a one way clutch unit for connecting said countershafts, said clutch being adapted to operatively join said countershafts after a predetermined interval of movement of said main drive shaft, sprocket driving means connected between the other of said countershafts and the film sprocket to advance the film during the effective operation of said one way clutch, and automatic stop means adapted for stopping the clutch driven countershaft after a definite lineal advance of the film, said stop means being controlled by the movement of said main drive shaft.

9. A film transport mechanism for picture projection comprising an oscillatory drive shaft, a pair of countershafts, and a film driving sprocket to advance the film for changing the picture images, intermeshing toothed elements between said drive shaft and one of the countershafts to positively revolve the latter, while said drive shaft revolves in one direction, a lost motion one way clutch unit for connecting said countershafts, said clutch being adapted to operatively join said countershafts after a predetermined interval of movement of said main drive shaft in said one direction, sprocket driving means connected between the other of said countershafts and the film sprocket to advance the film during the effective operation of said one way clutch, and means for returning said drive shaft to its initial starting position after the film is advanced a predetermined lineal amount.

10. A film transport mechanism for picture projection comprising an oscillatory drive shaft, a pair of countershafts, and a film driving sprocket to advance the film for changing the picture images, intermeshing toothed elements between said drive shaft and one of the countershafts to positively revolve the latter, while said drive shaft revolves in one direction, a lost motion one way clutch unit for connecting said countershafts, said clutch being adapted to operatively join said countershafts after a predetermined interval of movement of said main drive shaft in said one direction, sprocket driving means connected between the other of said countershafts and the film sprocket to advance the film during the effective operation of said one way clutch, and spring actuated means connected with said drive shaft to return the latter to its starting position, said one way clutch including means for permitting said reversal of movement of said drive shaft independently of said sprocket driving mechanism.

11. A film transport mechanism for projectors comprising an oscillatory main drive shaft, a pair of countershafts, and film driving mechanism for advancing the film, intermeshing toothed elements on said main drive shaft and on one of said countershafts for rotating said one of said countershafts, independent stop mechanism connected between said main drive shaft and the other of said countershafts to limit the rotational movement of said latter shaft, said latter shaft having means for actuating said film driving mechanism, and operative connectible means coacting between said countershafts to transmit the drive from said main drive shaft to said film driving mechanism, said connectible means having delayed action to permit the functioning of said independent stop mechanism whereby the film is advanced the same lineal amount during each cycle of rotation of the other of said countershafts as allowable between its limits of operation and as determined by said stop mechanism.

12. A film transport mechanism for projectors comprising an oscillatory main drive shaft, a pair of countershafts, and film driving mechanism for advancing the film, a gear segment on said main drive shaft and a pinion on one of said countershafts meshing with said gear segment for rotating said one of said countershafts, independent stop mechanism connected between said main drive shaft and the other of said countershafts to limit the rotational movement of said latter shaft, shiftable variable speed gear means connected with said latter shaft for actuating said film driving mechanism, and operative connectible means coacting between said countershafts to transmit the drive from said main drive shaft to said film driving mechanism, said connectible means having delayed action to permit the functioning of said independent stop mechanism whereby the film is advanced the same lineal amount during each cycle of rotation of the other of said countershafts as allowable between its limits of operation and as determined by said stop mechanism, said lineal advance of said film being adjustable to change the amount of film feed per cycle through the operation of said shiftable variable speed gear means.

13. A film transport mechanism for picture projectors comprising an oscillatory drive shaft, a pair of coaxially aligned countershafts, a gear segment on said drive shaft and a pinion on one of said countershafts and meshing with said gear segment, adjacently disposed clutch discs, one mounted on each countershaft, a spring actuated dog pivotally carried by one disc and a pin carried by the other disc and extending into the path of rotation of the dog, film sprocket mechanism to intermittently advance the film and gearing between said other countershaft and said film sprocket mechanism.

14. A film transport mechanism for picture projectors comprising an oscillatory drive shaft, a pair of coaxially aligned countershafts, a gear segment mounted on said drive shaft, a pinion meshing with said gear segment and mounted on one of said countershafts, a lost motion unidirectional clutch connected between said countershafts, film sprocket mechanism to intermittently advance the film, and gearing between said other countershaft and said film sprocket mechanism.

15. A film transport mechanism for picture projectors comprising an oscillatory main drive shaft, a pair of aligned countershafts, and a film driving sprocket to advance the film for changing the picture images, intermeshing toothed elements between said main drive shaft and one of the countershafts to positively revolve the latter, a one-way clutch unit for connecting said countershafts, said clutch being adapted to operatively join said countershafts after a predetermined interval of movement of said main drive shaft, sprocket driving means connected between the other of said countershafts and the film sprocket to advance the film during the effective operation of said one-way clutch, a notched disc mounted on said other countershaft, an arm having a tooth arranged to be projected into said notch, means operated by said main drive shaft for actuating said arm to disengage the tooth from the notch and resilient means to actuate said arm and move the tooth into said notch.

CHARLES WIDELL.